United States Patent Office 3,547,703
Patented Dec. 15, 1970

3,547,703
NONAQUEOUS BATTERY WITH ETHYLENE
GLYCOL SULFITE ELECTROLYTE SOLVENT
George E. Blomgren, Lakewood, and George W. Jackson, Cleveland, Ohio, assignors to Union Carbide Corporation, New York, N.Y., a corporation of New York
No Drawing. Filed Nov. 29, 1968, Ser. No. 780,230
Int. Cl. H01m 11/00
U.S. Cl. 136—154                                           10 Claims

ABSTRACT OF THE DISCLOSURE

This invention relates to the use, as a nonaqueous battery electrolyte, of a solute dissolved in ethylene glycol sulfite.

---

This invention relates to battery electrolytes and more particularly to nonaqueous battery electrolytes of the type having a solute dissolved in a nonaqueous solvent.

The development of high energy battery systems requires the compatibility of an electrolyte possessing desirable electrochemical properties with highly reactive anode materials, such as lithium, and the efficient use of high energy density cathode materials, such as nickel fluoride. The use of aqueous electrolytes is precluded in these system since the anode materials are sufficiently active to decompose water chemically. It has therefore been necessary, in order to realize the high energy density obtainable through use of these highly reactive anodes and high energy density cathodes, to turn to the investigation of nonaqueous electrolyte systems and more particularly to nonaqueous organic electrolyte systems.

The term "nonaqueous organic electrolyte" as used herein refers to an electrolyte which is composed of a solute, such as a salt or complex salt of Group I-A, Group II-A or Group III-A elements of the Periodic Table, dissolved in an appropriate non-aqueous organic solvent. Conventional solvents include propylene carbonate, ethylene carbonate or γ-butyrolactone. The term "Periodic Table" as used herein refers to the Periodic Table of the Elements as set forth on the inside back cover of the Handbook of Chemistry and Physics, 48th Edition, The Chemical Rubber Co., Cleveland, Ohio, 1967–1968.

A multitude of solutes are known and recommended for use but the selection of a suitable solvent has been particularly troublesome since those solvents which form electrolytes which are sufficiently conductive to permit effective ion migration through the solution are reactive with the highly reactive anodes described above. Most investigators in this area, in search of suitable solvents, have concentrated on aliphatic and aromatic nitrogen- and oxygen-containing compounds with some attention given to organic sulfur-, phosphorus- and arsenic-containing compounds. The result of this search has not been satisfactory since the solvents investigated still could not be used effectively with extremely high energy density cathode materials, such as nickel fluoride, and were sufficiently corrosive to lithium anodes to prevent efficient performance over any length of time.

It is an object of the present invention to provide an electrolyte solvent in which the cathode materials commonly used in nonaqueous electromechanical systems will be substantially insoluble.

It is a further object to provide an electrolyte solvent system in which there is observed low cathodic polarization, low corrosion of highly reactive anode materials, and minimum decomposition of the solvent.

It is a further object to provide an electrolyte solvent which is compatible with a number of the better solutes presently known and which can be used satisfactorily in combination with highly reactive materials such as lithium metal anodes.

These and other objects are accomplished by the use, as an electrolyte solvent, of the compound ethylene glycol sulfite.

The compound ethylene glycol sulfite is a liquid over the approximate temperature range of −11° C. to 173° C. and has a specific gravity of 1.4402 at 20° C. The compound has a molecular weight of 108.2 and has the structural formula

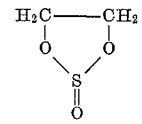

It has been found that this compound possesses exceptional and unexpected properties which make it suitable as an electrolyte solvent with a broad range of solutes, anodes and cathodes, some of which have heretofore been considered too reactive or otherwise unsuitable for battery applications. For example, as described above, the compound nickel fluoride has a very high energy density and therefore is potentially an excellent cathodic material. However, due to its low electrochemical activity, advantage has not heretofore been fully taken of the high energy density capability of nickel fluoride.

The solvent of the present invention makes the use of nickel fluoride practical as a cathodic material since nickel fluoride is relatively insoluble in ethylene glycol sulfite and displays high electrochemical activity therein.

Moreover, it has been found that highly reactive anode materials, such as lithium metal, have low reactivity with ethylene glycol sulfite.

As is true of most electrolyte solvents, the use of ethylene glycol sulfite as a solvent is not restricted to any specific anode, cathode or solute materials and it has been found that this compound is useful within a very broad range of well-known battery components.

While lithium is the preferred anode material, the other alkali and alkaline earth metals, for example, sodium, calcium and magnesium can also be used.

The metal halides are the preferred cathode materials and, of these, the halides considered most useful include chromous chloride, chromic chloride, cobaltous chloride, cobaltic chloride, cobaltous fluoride, cobaltic fluoride, cuprous chloride, cupric chloride, cuprous fluoride, cupric fluoride, lead chloride, lead fluoride, mercurous chloride, mercuric chloride, mercurous fluoride, mercuric fluoride, nickel chloride, nickel fluoride, silver chloride, silver fluoride and silver difluoride.

As has previously been described, nonaqueous electrolytes comprise a solute dissolved in a solvent. A very large number of solutes can be successfully employed in the solvent of the present invention and these solutes typically comprise salts, including complex salts, of Group I-A, Group II-A, and Group III-A elements of the Periodic Table. Preferred solutes include lithium perchlorate, sodium-hexafluorophosphate, lithium hexafluorophosphate, lithium tetrafluoroborate, potassium hexafluoroarsenate, lithium hexafluoroarsenate and sodium hexafluoroarsenate.

The solvent of the present invention is particularly useful in primary battery applications but can also be used in rechargeable cells, for example, those employing a silver chloride cathode in combination with a suitable anode, e.g., lithium.

As will be obvious to those skilled in the art, other compatible solvents may be added to the solvent of the present invention to alter various properties of the system, such as lowering the freezing point, etc.

The following examples are merely for illustrative purposes and are in no way intended to limit the scope of the invention as herein set forth.

EXAMPLE 1

Laboratory test cells were prepared using lithium metal anodes, nickel fluoride cathodes and an electrolyte of 1.0 molar lithium perchlorate in ethylene glycol sulfite.

TABLE I.—COMPARATIVE PERFORMANCE OF LITHIUM/NICKEL FLUORIDE CELL WITH TWO ELECTROLYTES

| Time, minutes | 1.5 molar lithium perchlorate in ethylene glycol sulfite | | | 1.0 molar lithium perchlorate in propylene carbonate | | |
|---|---|---|---|---|---|---|
| | Ampere-min. | Watt-min. | Voltage | Ampere-min. | Watt-min. | Voltage |
| 10 | 0.008 | 0.020 | 2.45 | 0.008 | 0.019 | 2.38 |
| 20 | 0.016 | 0.038 | 2.38 | 0.016 | 0.037 | 2.35 |
| 30 | 0.024 | 0.055 | 2.35 | 0.024 | 0.054 | 2.27 |
| 40 | 0.032 | 0.074 | 2.30 | 0.032 | 0.070 | 2.21 |
| 50 | 0.040 | 0.091 | 2.27 | 0.040 | 0.081 | 2.12 |
| 60 | 0.048 | 0.106 | 2.20 | 0.048 | 0.096 | 2.02 |
| 70 | 0.056 | 0.122 | 2.18 | 0.056 | 0.110 | 1.98 |
| 80 | 0.064 | 0.136 | 2.12 | 0.064 | 0.126 | 1.98 |
| 90 | 0.072 | 0.146 | 2.02 | 0.072 | 0.140 | 1.98 |

In these test cells currents as high as 20 milliampere per square centimeter were obtained with low cathodic polarization of the order of 30–50 millivolts. The open circuit voltage was 2.80 volts and, depending upon current drain, the cell discharged at 2.60 volts on 0.8 milliampere per square centimeter and 2.20 volts on 2 milliampere per square centimeter.

Similar cells with a propylene carbonate-aluminum chloride electrolyte exhibited much greater cathodic polarization of the order of 100–150 millivolts at the same current drain.

EXAMPLE 2

A test cell was prepared using a lithium metal anode, silver chloride cathode and an electrolyte of 1.1 molar lithium perchlorate in ethylene glycol sulfite. Both the lithium sheet anode and silver chloride cathode were 6 square centimeters in apparent area. A fiber glass separator was used.

The cell was impregnated under vacuum with about 2 cubic centimeters of electrolyte and was discharged on a 6 milliampere (1 milliampere per square centimeter) current drain.

The discharge data were as follows:

| Time: | Voltage |
|---|---|
| Initial (open circuit) | 2.80 |
| Initial (closed circuit) | 2.39 |
| 1 hour | 2.41 |
| 2 hours | 2.45 |
| 3 hours | 2.44 |
| 4 hours | 2.40 |
| 5 hours | 2.34 |
| 6 hours | 2.33 |

EXAMPLE 3

A number of test cells were prepared using anodes of 0.015 inch thick lithium sheet, cathodes of a mixture of 65 percent nickel powder and 35 percent nickel fluoride powder dry pressed onto a nickel screen at 50,000 pounds per square inch. Apparent electrode surface area was 1 square inch in each instance.

Tests of these cells with an electrolyte of 1.5 molar lithium perchlorate in ethylene glycol sulfite yielded an initial open circuit cell voltage of 3.00 volts. Under a 5 milliampere current drain (0.8 milliampere per square centimeter), the initial closed circuit voltage was 2.60 volts with cathodic polarization of only 50 millivolts. After 1 hour on this drain, the open circuit voltage dropped to 2.60 volts while the closed circuit voltage was 2.20 volts. After 1.5 hours of discharge, the open circuit voltage dropped to 2.30 volts while the closed circuit voltage was 2.02 volts.

Similar cells with an electrolyte of 1.0 molar lithium perchlorate in propylene carbonate also showed an initial open circuit voltage of 3.0 volts. However, under a 5 milliampere current drain, the initial closed circuit voltage was 2.40 volts, and after 30 minutes, the cathodic polarization had increased to 80 millivolts. After 2 hours discharge the open circuit voltage was 2.0 volts, while the closed circuit voltage was 1.80 volts.

The performance of these two electrolytes in terms of current, power, and voltage output is compared in Table I.

The comparison of the two electrolytes described above demonstrates the superiority of the solvent ethylene glycol sulfite since each of these electrolytes was prepared at concentrations which represent the maximum conductivity for each solution and the electrolyte containing ethylene glycol sulfite allowed consistently higher power and voltage output than the propylene carbonate electrolyte at each of the time periods measured.

While the present invention has been described with reference to many particular details thereof, it is not intended that these details shall be construed as limiting the scope of this invention.

What is claimed is:

1. A nonaqueous battery system comprising an anode and cathode at different potentials and an electrolyte containing as an essential ingredient ethylene glycol sulfite.

2. The nonaqueous battery system of claim 1 wherein the ethylene glycol sulfite is present as a solvent for a solute selected from the group consisting of salts and complex salts of Group I–A, Group II–A, and Group III–A elements of the Periodic Table.

3. The nonaqueous battery system of claim 1 wherein the anode is selected from the group consisting of alkali and alkaline earth metals.

4. The nonaqueous battery system of claim 1 wherein the cathode is a metal halide.

5. The nonaqueous battery system of claim 1 wherein the anode is lithium metal, the cathode is nickel fluoride, and the electrolyte is a solution of lithium perchlorate in ethylene glycol sulfite.

6. The nonaqueous battery system of claim 1 wherein the anode is lithium metal, the cathode is silver chloride, and the electrolyte is a solution of lithium perchlorate in ethylene glycol sulfite.

7. The nonaqueous battery system of claim 2 wherein the solute is lithium perchlorate.

8. The nonaqueous battery system of claim 3 wherein the anode is lithium metal.

9. The nonaqueous battery system of claim 4 wherein the cathode is nickel fluoride.

10. The nonaqueous battery system of claim 4 wherein the cathode is silver chloride.

References Cited

UNITED STATES PATENTS

| 3,393,093 | 7/1968 | Shaw et al. | 136—155X |
| 3,468,716 | 9/1969 | Eisenberg | 136—154X |

WINSTON A. DOUGLAS, Primary Examiner

DONALD L. WALTON, Assistant Examiner

U.S. Cl. X.R.

136—155